(12) United States Patent
Holmes et al.

(10) Patent No.: US 9,303,437 B1
(45) Date of Patent: Apr. 5, 2016

(54) CLOSURE ASSEMBLY INCORPORATING AN INTEGRATED ARTICULATING CLOSURE HINGE AND COVER

(71) Applicant: FORD GLOBAL TECHNOLOGIES, LLC, Dearborn, MI (US)

(72) Inventors: George Holmes, Plymouth, MI (US); Paul Johnston, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/487,291

(22) Filed: Sep. 16, 2014

(51) Int. Cl.
| | | |
|---|---|---|
| *B62D 25/00* | (2006.01) |
| *E05D 11/00* | (2006.01) |
| *B62D 25/02* | (2006.01) |
| *B60J 5/04* | (2006.01) |
| *E05D 3/06* | (2006.01) |
| *E05F 1/12* | (2006.01) |
| *E05F 15/75* | (2015.01) |

(52) U.S. Cl.
CPC .............. *E05D 11/0054* (2013.01); *B60J 5/047* (2013.01); *B62D 25/02* (2013.01); *E05D 3/06* (2013.01); *E05F 1/1207* (2013.01); *E05F 15/75* (2015.01); *E05D 2011/0072* (2013.01)

(58) Field of Classification Search
CPC ....... E05D 11/0054; E05D 3/06; E05F 15/75; E05F 1/1207; B60J 5/047; B62D 25/02
USPC .......... 296/146.11, 146.12, 146.9, 202; 16/50
See application file for complete search history.

(56) References Cited

U.S. PATENT DOCUMENTS

| | | | | |
|---|---|---|---|---|
| 3,095,600 A | * | 7/1963 | Bretzner | .................. B60J 5/047 16/224 |
| 4,650,241 A | * | 3/1987 | Motonami | .............. E05D 3/147 16/370 |
| 6,609,748 B1 | | 8/2003 | Azzouz et al. | |
| 7,178,853 B2 | | 2/2007 | Oxley et al. | |

FOREIGN PATENT DOCUMENTS

| | | |
|---|---|---|
| EP | 0965515 A2 | 6/1994 |
| EP | 1138858 A1 | 10/2001 |
| GB | 2039323 A | 8/1980 |

* cited by examiner

*Primary Examiner* — Joseph D Pape
(74) *Attorney, Agent, or Firm* — Jason Rogers; King & Schickli, PLLC

(57) ABSTRACT

A closure assembly is provided including a closure having a closure hinge, a closure hinge cover and a linkage between the closure and the cover. When the closure is in a closed position, the cover extends in a plane overlying the closure hinge. When the closure is an opened position the cover is displaced to an open position to allow the closure hinge to pass through the plane that the cover assumes when the closure is closed.

17 Claims, 6 Drawing Sheets

CLOSURE ASSEMBLY INCORPORATING AN INTEGRATED ARTICULATING CLOSURE HINGE AND COVER

TECHNICAL FIELD

This document relates generally to the vehicle equipment field and, more particularly, to a new and improved closure assembly incorporating an integrated articulating exterior closure hinge and cover.

BACKGROUND

In the past, a gooseneck hinge has been used to connect a swinging closure such as a door to a vehicle. While a gooseneck hinge provides the necessary function, it suffers from a number of drawbacks. First, it may intrude substantially into the interior space of the vehicle when the enclosure is closed. Second, a gooseneck hinge has a relatively large open C-section which may lack the desired rigidity and allow for increased door sag. Third, the vehicle assembly process is relatively difficult as the gooseneck hinge must be inserted through a body side hole for attachment to the body.

This document relates to a closure assembly for a vehicle incorporating an integrated articulating exterior closure hinge and cover that is characterized by improved packaging efficiency (less intrusion into interior space), improved hinge rigidity and simpler and more efficient assembly. As a bonus, the new closure assembly has an added "wow" factor that draws attention to the vehicle.

SUMMARY

In accordance with the purposes and benefits described herein, a closure assembly is provided for a vehicle. The closure assembly includes a closure having a closure hinge and a closure hinge cover. A linkage is provided between the closure and the cover. When the closure is in a closed position the cover extends in a plane overlying the closure hinge and when the closure is opened, the cover is displaced to an open position to allow the closure hinge to pass through that plane.

In one possible embodiment, the linkage comprises a mechanical linkage having a first end connected by a first connector to the closure and a second end connected by a second connector to the cover. In this embodiment the first connector and second connector are spherical joints.

In addition, the closure assembly includes a cover support. The cover is pivotally connected to the cover support by a hinge pin. Further the closure hinge is a straight hinge with substantial strength and rigidity.

In one possible embodiment, the closure hinge includes a stop and the cover includes an abutment that engages the stop when the cover is in the closed position. The stop and/or the abutment may be adjustable so that when the cover is closed it is integrated into and aligns with the adjacent body panels of the vehicle.

In another possible embodiment, the linkage comprises a mechanical link and a cam. The cam is supported on an arm and the mechanical link has a first end connected by a first connector to the closure and a second end connected by a second connector to the arm. Both the first and second connectors are spherical joints. In this embodiment, the closure assembly further includes a biasing element that biases the cover into the closed position. In one possible embodiment the biasing element comprises a torsion spring that is received on the hinge pin that connects the cover to the cover support.

In still another embodiment the linkage is an electronic linkage. Such an electronic linkage includes a first touch sensor carried on an interior closure handle, a second touch sensor carried on an exterior closure handle, an electrical actuator to open and close the cover and an electronic control unit operatively connected to the first touch sensor, the second touch sensor and the electrical actuator. The electronic control unit opens and closes the closure in response to input data received from the first and second touch sensors.

In this third embodiment, as in the other embodiments, the closure hinge may be a straight hinge. Thus, the closure hinge may also include a stop and the cover may include an abutment that engages the stop when the cover is in a fully closed position.

In the following description, there are shown and described several preferred embodiments of the closure assembly. As it should be realized, the closure assembly is capable of other, different embodiments and its several details are capable of modification in various, obvious aspects all without departing from the closure assembly as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the closure assembly and together with the description serve to explain certain principles thereof. In the drawings.

Reference will now be made in detail to the present preferred embodiments of the closure assembly, examples of which are illustrated in the accompanying drawings.

DETAILED DESCRIPTION

Figure 1:
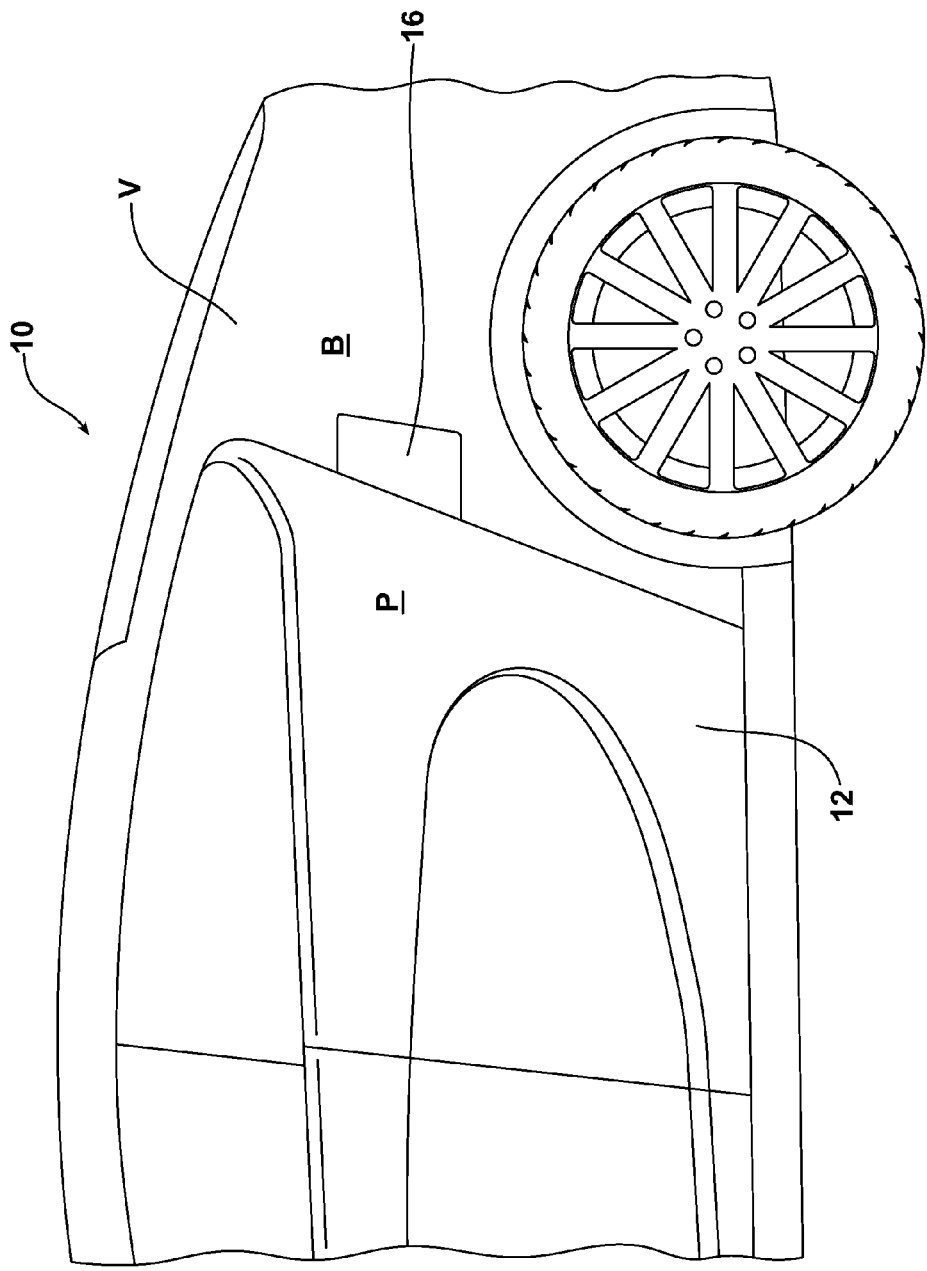
FIG. 1 is a schematical side elevational view of a vehicle incorporating the closure assembly that is the subject of this document. As illustrated, the closure assembly is in the closed position.
Figure 2:
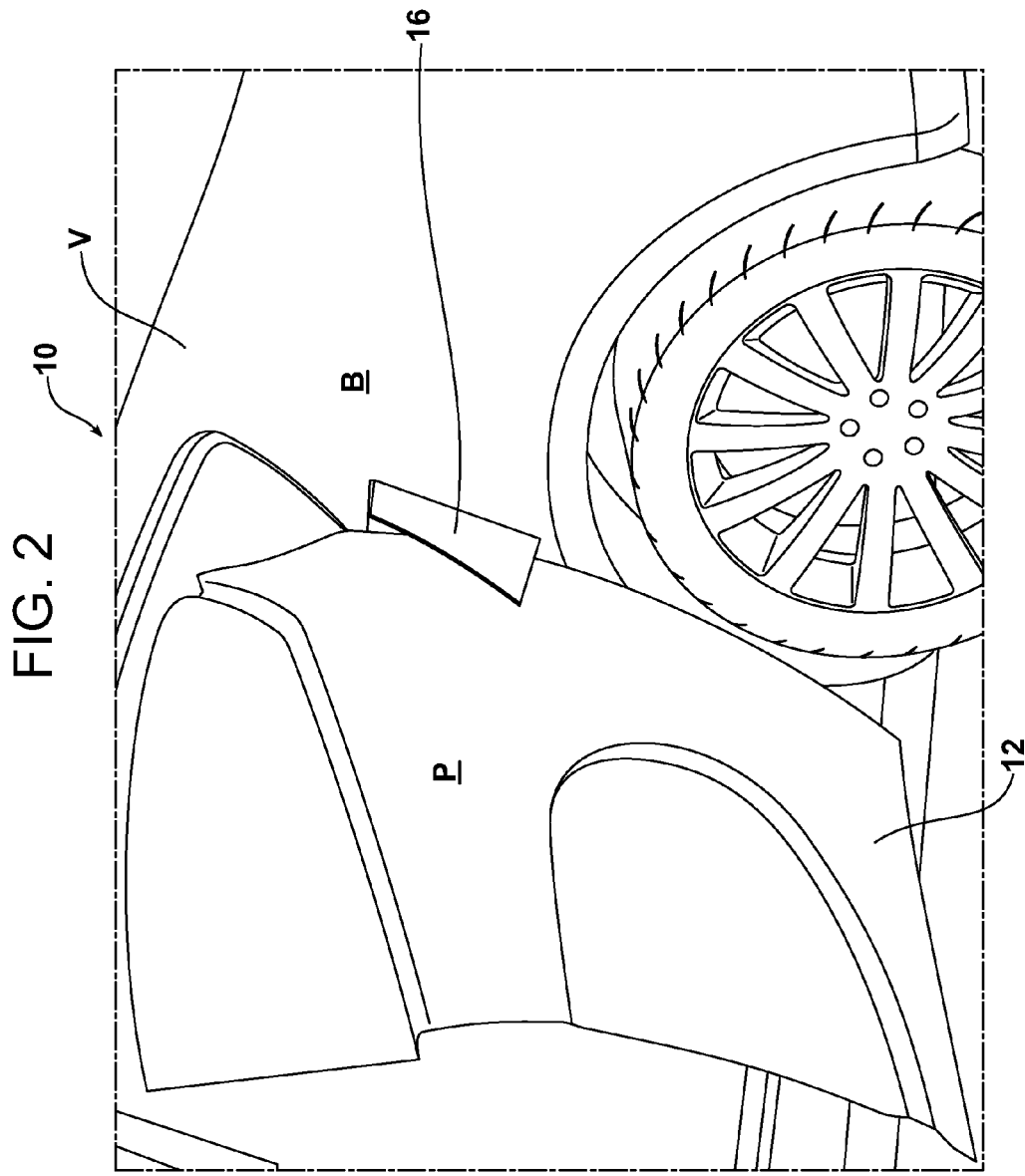
FIG. 2 is a side elevational view similar to FIG. 1 but illustrating the closure assembly in the fully open position.

Reference is now made to FIGS. 1 and 2 illustrating a vehicle V incorporating the closure assembly 10 that is the subject of this document. In the illustrated embodiment the closure assembly 10 comprises a rearwardly hinged rear door of the vehicle V. FIG. 1 illustrates the closure assembly 10 in a fully closed position. FIG. 2 illustrates the closure assembly 10 in a fully open position. While the illustrated closure assembly 10 comprises a rear door, it should be appreciated that the closure assembly has other applications including front doors, hoods, trunk lids, hatchbacks, tailgates or any other closure structure on a vehicle.

Figure 3:
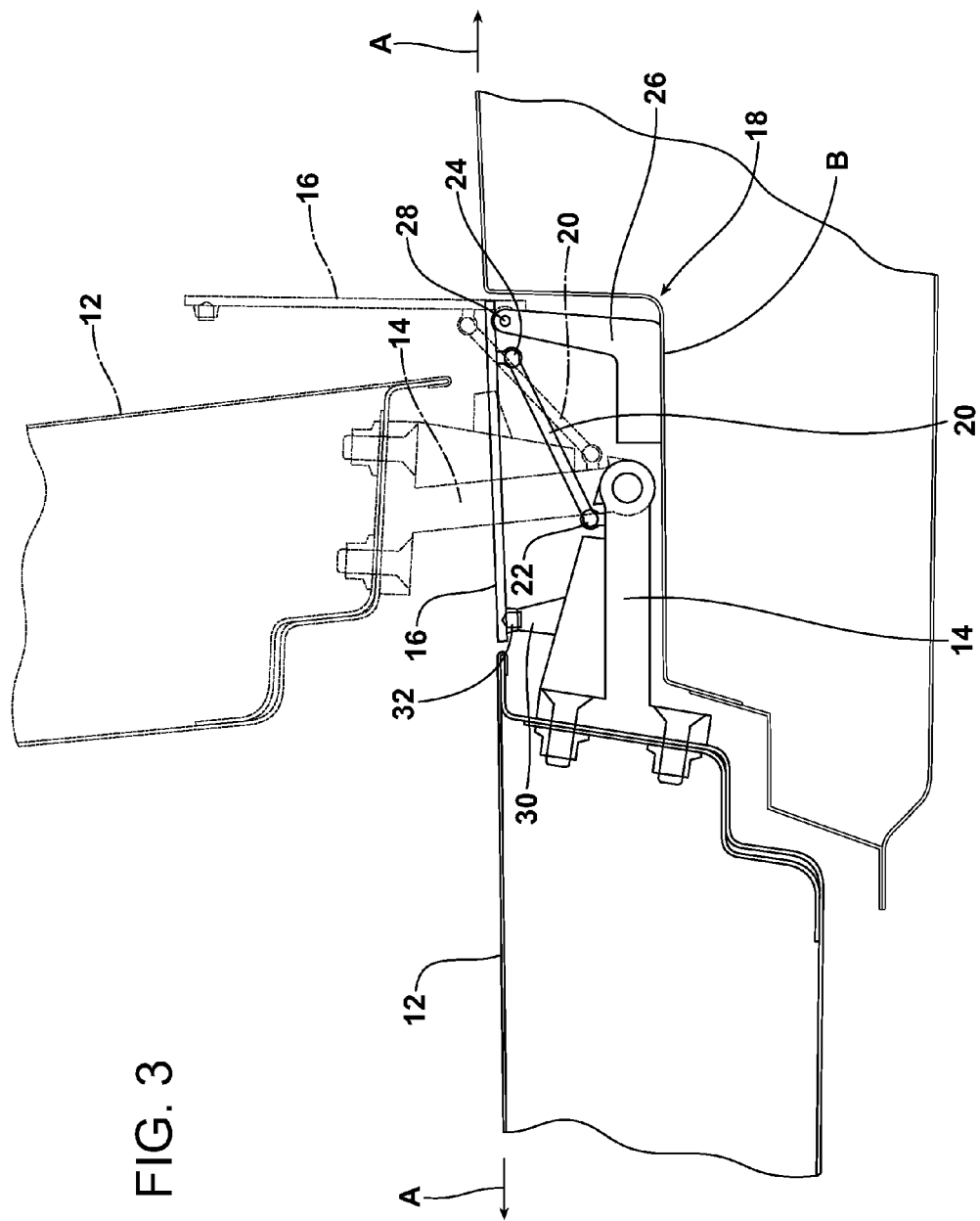
FIG. 3 is a schematical cross-section view illustrating the structure of a first embodiment of the closure assembly.

As best illustrated in FIGS. 1-3, a first embodiment of the closure assembly 10 comprises a closure or door 12, a closure hinge 14, a closure hinge cover 16 and a linkage 18 between the closure and the cover. When the closure 12 is in the closed position, illustrated in FIG. 1, the cover 16 extends in a plane overlying the closure hinge 14 which is aligned and flush with the body panel B and the outer door panel P. Thus the aerodynamic shape and smooth outer surface of the vehicle V are maintained.

In contrast, as illustrated in FIG. 2, when the closure 12 is in the open position, the cover 16 is displaced to an open position that allows the closure hinge 14 to pass through the plane that the cover assumes when the closure is in the fully closed position.

As best illustrated in FIG. 3, in the first embodiment, the linkage 18 comprises a mechanical link 20 having a first end connected by a first connector 22 to the closure 12 and a second end connected by second connector 24 to the cover 16. In one possible embodiment the first and second connectors 22, 24 are spherical joints to accommodate for a geometry where the cover hinge and closure hinge points are not co-planar.

It should be appreciated that the linkage 18 illustrated in FIG. 3 is of the 4-bar type and has a ratio such that the cover 16 swings away at a faster rate than the door closure 12 so as to not interfere while opening.

As further illustrated in FIG. 3, the closure assembly includes a cover support 26 that is bolted or otherwise secured to the body B of the vehicle V. The cover 16 is pivotally connected to the cover support 26 by means of the hinge pin 28.

As further illustrated in FIG. 3, the closure hinge 14 includes a stop 30 and the cover 16 includes an abutment 32 that engages the stop when the cover is in the closed position. Either the stop 30 or the abutment 32 may include a threaded end which allows for adjustment to ensure that the cover 16 is supported in the fully aligned and flush position when the closure is closed (see FIGS. 1 and 3).

Figure 4:
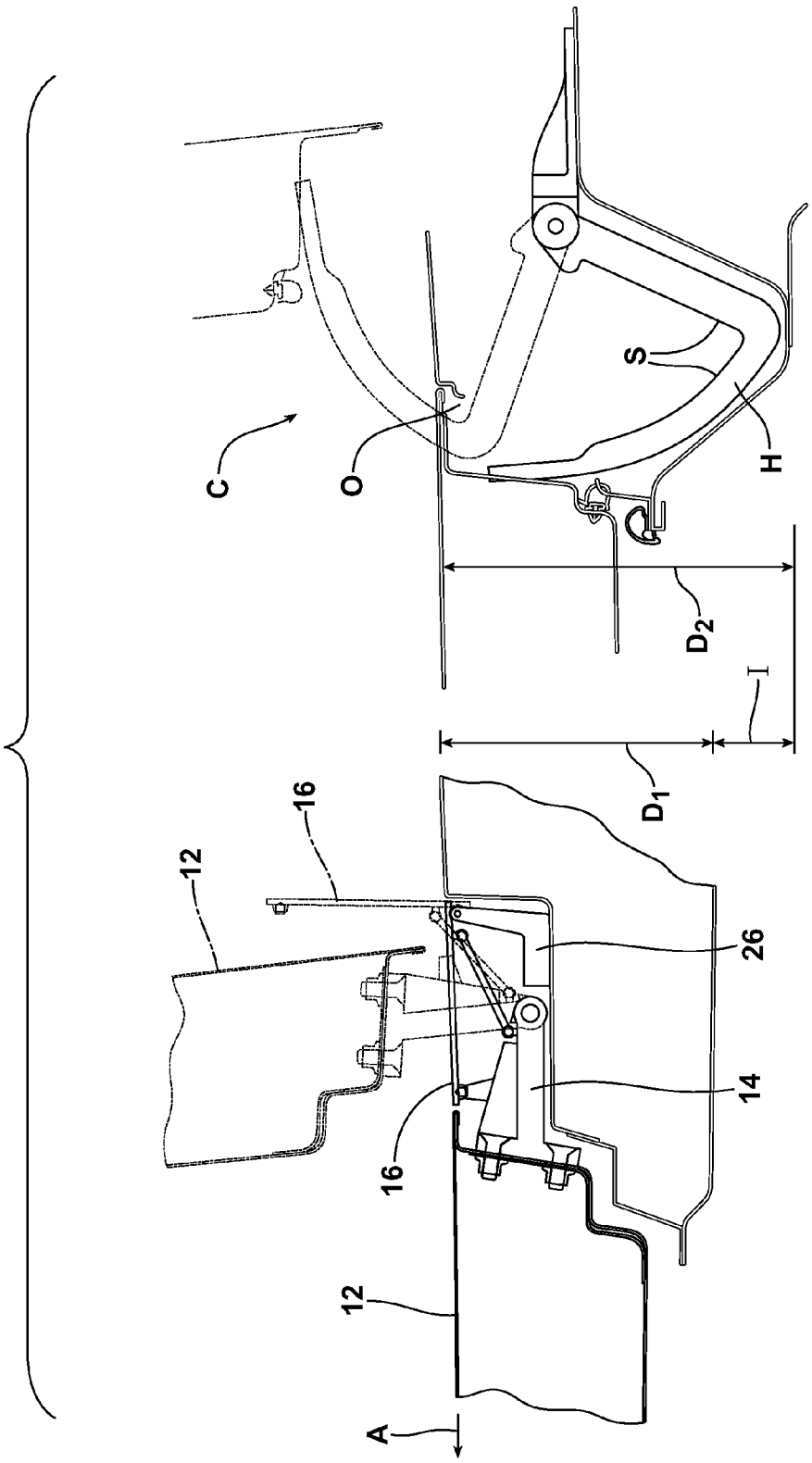
FIG. 4 is a schematical cross-sectional comparison of the closure assembly in FIG. 3 with a closure assembly mounted by means of a gooseneck hinge.

Reference is now made to FIG. 4 which compares the closure assembly 10 to a closure assembly C which incorporates a gooseneck hinge H. As illustrated, the closure hinge 14 of the closure assembly 10 is a simple straight hinge which has substantial improved structural rigidity. In contrast, the gooseneck hinge H has a large open C-section which has less structural rigidity with increased door sag.

As should be further appreciated from reviewing FIG. 4, when the closure assembly 10 is opened, the cover 16 opens so that the hinge 14 may swing through the plane A that the cover assumes when the cover is closed.

In contrast, the gooseneck hinge H swings through and around the body opening O. In order to do this, the hinge must include the relatively large open C-section S. Advantageously, the closure hinge 14 of the closure assembly 10 has a more efficient package design having a total structure width $D_1$, less than that of the gooseneck hinge total structure width $D_2$. Thus, as illustrated in FIG. 4, the closure assembly 10 allows for an increase of interior space (I) in comparison to the gooseneck hinge. When you consider such an increase in interior compartment size is provided on both sides of the vehicle, the increase in cabin capacity is greatly appreciated by the occupants in the interior compartment of the vehicle.

Figure 5:
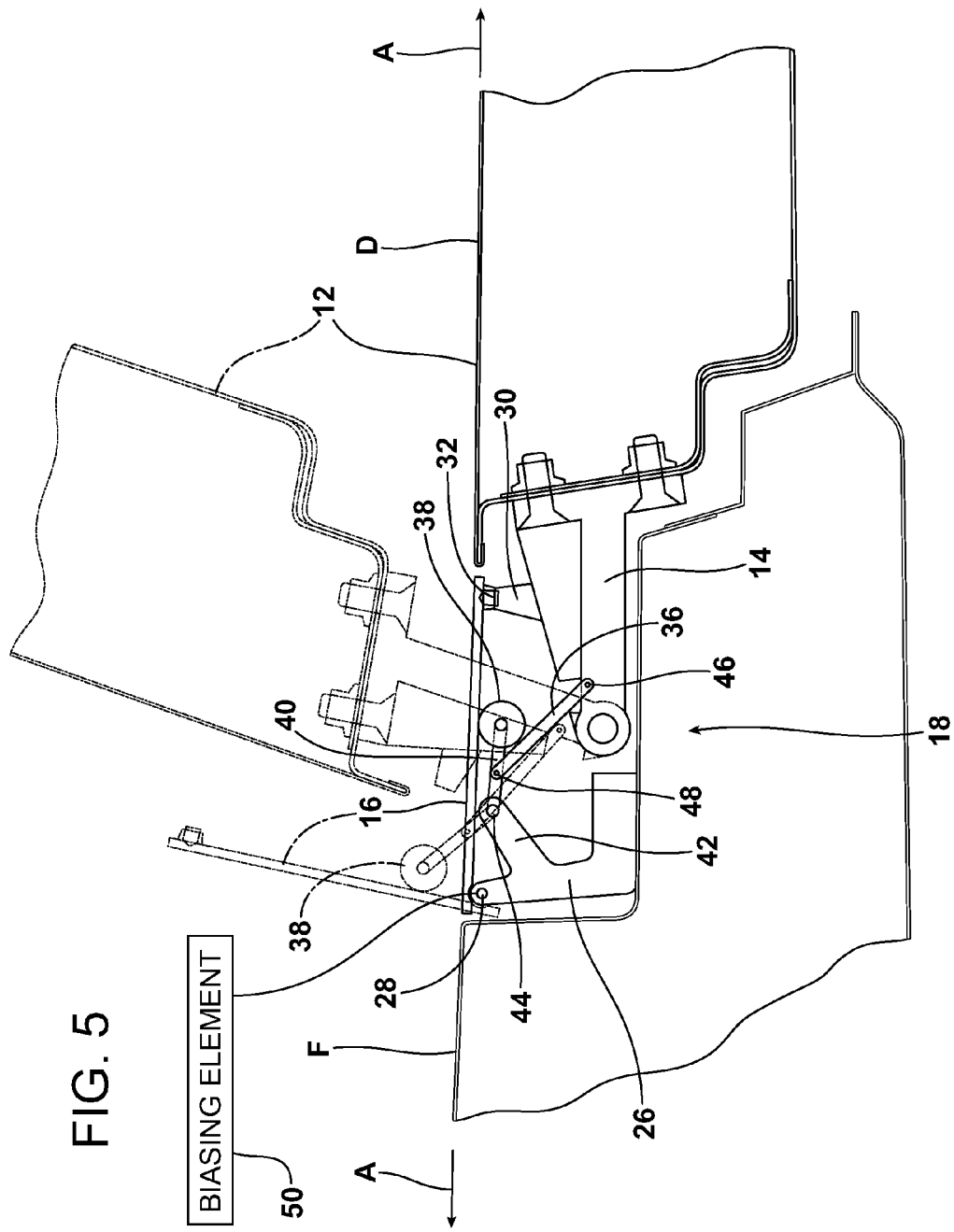
FIG. 5 is a schematical cross-sectional view of a second embodiment of the closure assembly.

Reference is now made to FIG. 5 illustrating a second embodiment of the closure assembly 10 wherein the linkage 18 comprises a mechanical link 36 and a cam 38. As illustrated, the cam 38 is supported on an arm 40 that is pivotally connected at the opposite end to a lug 42 provided on the cover support 26 by means of pivot pin 44. As further illustrated, the mechanical link 36 has a first end connected by the connector 46 to the closure 12 and a second end connected by a second connector 48 to the arm 40. Both the first and second connectors 46, 48 comprise spherical joints. As further illustrated, the cover 16 is pivotally connected to the cover support 26 at a first point by the hinge pin 28. That first point is spaced from the second point where the arm 40 is connected to the cover support 26 by the pivot pin 44.

This second embodiment also includes a stop 30 and an abutment 32 that operate in the same manner as the stop and abutment of the FIG. 1 embodiment. In addition, this second embodiment includes a biasing element 50 in the form of a torsion spring that biases the cover 16 into the closed position. When the closure member is opened, the mechanical link 36, connected between the closure hinge 14 and the arm 40, causes the arm 40 to pivot on pivot pin 44 so that the cam 38 on the other end of the arm pushes the cover 16 into the open position thereby allowing the straight closure hinge 14 to swing through the plane A that the cover assumes when the cover is in the closed position.

When the closure 12 is closed, the mechanical link 36 pulls the arm 40 pivoting the arm about the pivot pin 44 and swinging the cam 38 into the closed position inside the plane A. Simultaneously, the biasing element 50 exerts a biasing force that swings the cover 16 about the hinge pin 28 until the cover is in the fully closed position with the abutment 32 engaging the stop 30 so that the cover is positively held in plane A where it is flush with the fender panel F and the door panel D.

Figure 6:
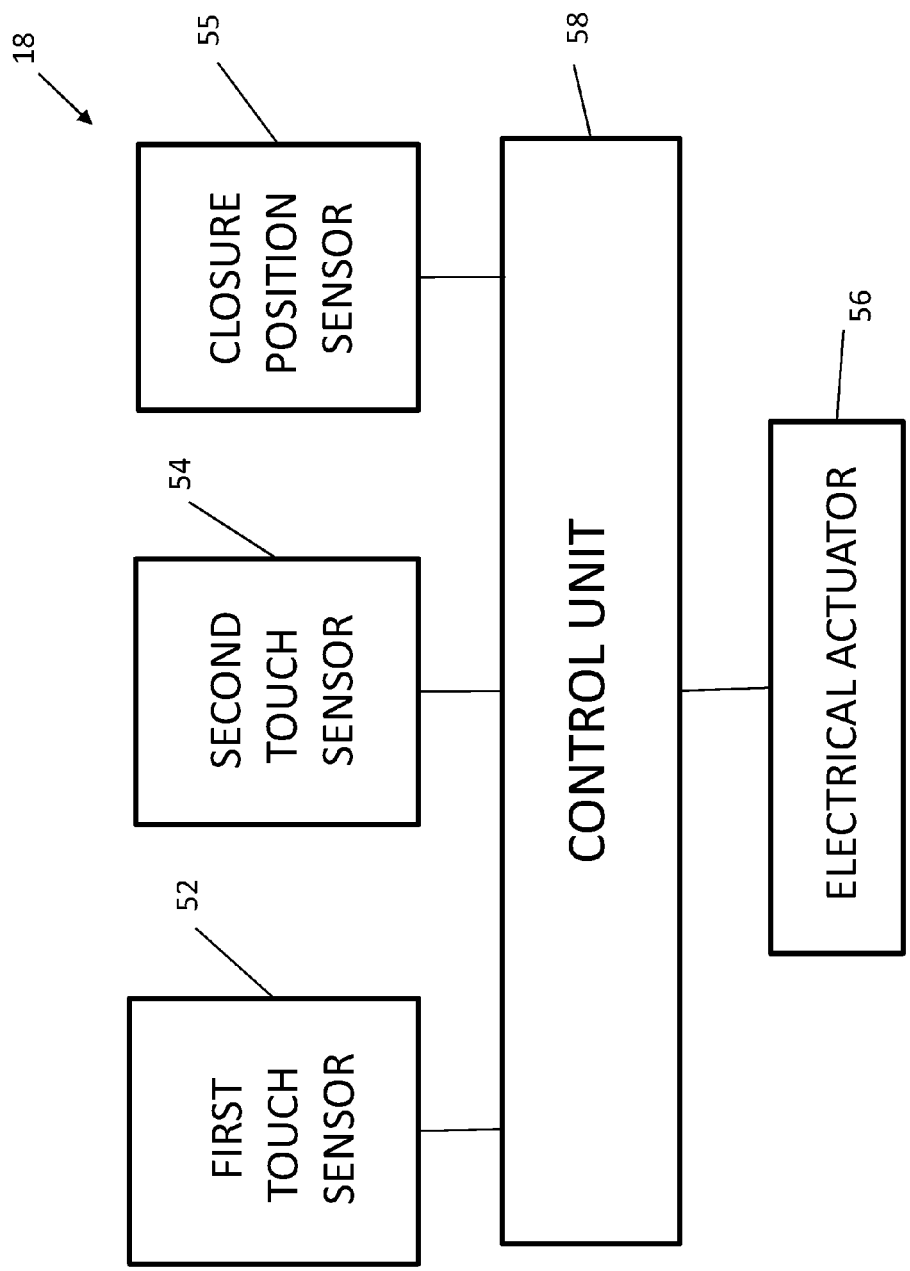
FIG. 6 is a schematical block diagram of a third embodiment of the closure assembly.

Reference is now made to FIG. 6 illustrating a third embodiment of the closure assembly wherein the link 18 is an electronic linkage. As illustrated, the electronic linkage 18 includes a first touch sensor 52 that is carried on an interior closure or door handle (not shown), a second touch sensor 54 carried on an exterior closure or door handle, an electrical actuator 56 that opens and closes the cover 16 and an electronic control unit or microprocessor 58 that is operatively connected to the first touch sensor 52, the second touch sensor 54 and the electrical actuator 56. When an individual touches either the interior or exterior door handle to open the closed door 12, the associated touch sensor 52, 54 sends a signal to the control unit 58. In response, the control unit 58 sends a signal to the electrical actuator 56 which swings the cover into the open position thereby allowing the hinge 14 to swing through the plane A as the closure 12 is opened. When the closure or door 12 is closed, the door sensor 55 sends a signal to the control unit 58. In response, the control unit 58 sends a signal to the electrical actuator 56 causing the cover 16 to close where it is supported in plane A by the stop and abutment as described above.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A closure assembly for a vehicle, comprising:
    a closure including a closure hinge wherein said closure hinge is a straight hinge;
    a closure hinge cover; and
    a linkage between said closure and said cover whereby when said closure is in a closed position said cover extends in a plane overlying said closure hinge and when said closure is opened said cover is displaced to an open position to allow said closure hinge to pass through said plane and wherein said closure hinge includes a stop and said cover includes an abutment that engages said stop when said cover is in said closed position.

2. The assembly of claim 1, wherein said linkage comprises a mechanical link having a first end connected by a first connector to said closure and a second end connected by a second connector to said cover.

3. The assembly of claim 2, wherein said first connector and said second connector are spherical joints.

4. The assembly of claim 2, further including a cover support, said cover being pivotally connected to said cover support by a hinge pin.

5. The assembly of claim 1, wherein one of said stop and said abutment are adjustable.

6. A closure assembly for a vehicle, comprising:
   a closure including a closure hinge;
   a closure hinge cover; and
   a mechanical link and a cam linkage between said closure and said cover whereby when said closure is in a closed position said cover extends in a plane overlying said closure hinge and when said closure is opened said cover is displaced to an open position to allow said closure hinge to pass through said plane.

7. The assembly of claim 6, wherein said cam is supported on an arm and said mechanical link has a first end connected by a first connector to said closure and a second end connected by a second connector to said arm.

8. The assembly of claim 7, wherein said first connector and said second connector are spherical joints.

9. The assembly of claim 8, further including a cover support, said cover being pivotally connected to said cover support at a first point by a hinge pin and said arm being pivotally connected to said cover support at a second point by a pivot pin.

10. The assembly of claim 9, wherein said closure hinge is a straight hinge.

11. The assembly of claim 10, wherein said closure hinge includes a stop and said cover includes an abutment that engages said stop when said cover is in said closed position.

12. The assembly of claim 11, wherein one of said stop and said abutment are adjustable.

13. The assembly of claim 9, further including a biasing element biasing said cover into a closed position.

14. The assembly of claim 9, wherein said biasing element is a torsion spring on said hinge pin.

15. A closure assembly for a vehicle comprising:
    a closure including a closure hinge;
    a closure hinge cover; and
    an electronic linkage between said closure and said cover whereby when said closure is in a closed position said cover extends in a plane overlying said closure hinge and when said closure is opened said cover is displaced to an open position to allow said closure hinge to pass through said plane, wherein said electronic linkage includes a first touch sensor carried on an interior closure handle, a second touch sensor carried on an exterior closure handle, an electrical actuator to open and close said cover and an electronic control unit operatively connected to said first touch sensor, said second touch sensor and said electrical actuator, wherein said electronic control unit opens and closes said closure in response to input data received from said first and second touch sensors.

16. The assembly of claim 15, wherein said closure hinge is a straight hinge.

17. The assembly of claim 16, wherein said closure hinge includes a stop and said cover includes an abutment that engages said stop when said cover is in a fully closed position.

* * * * *